Figure 1:
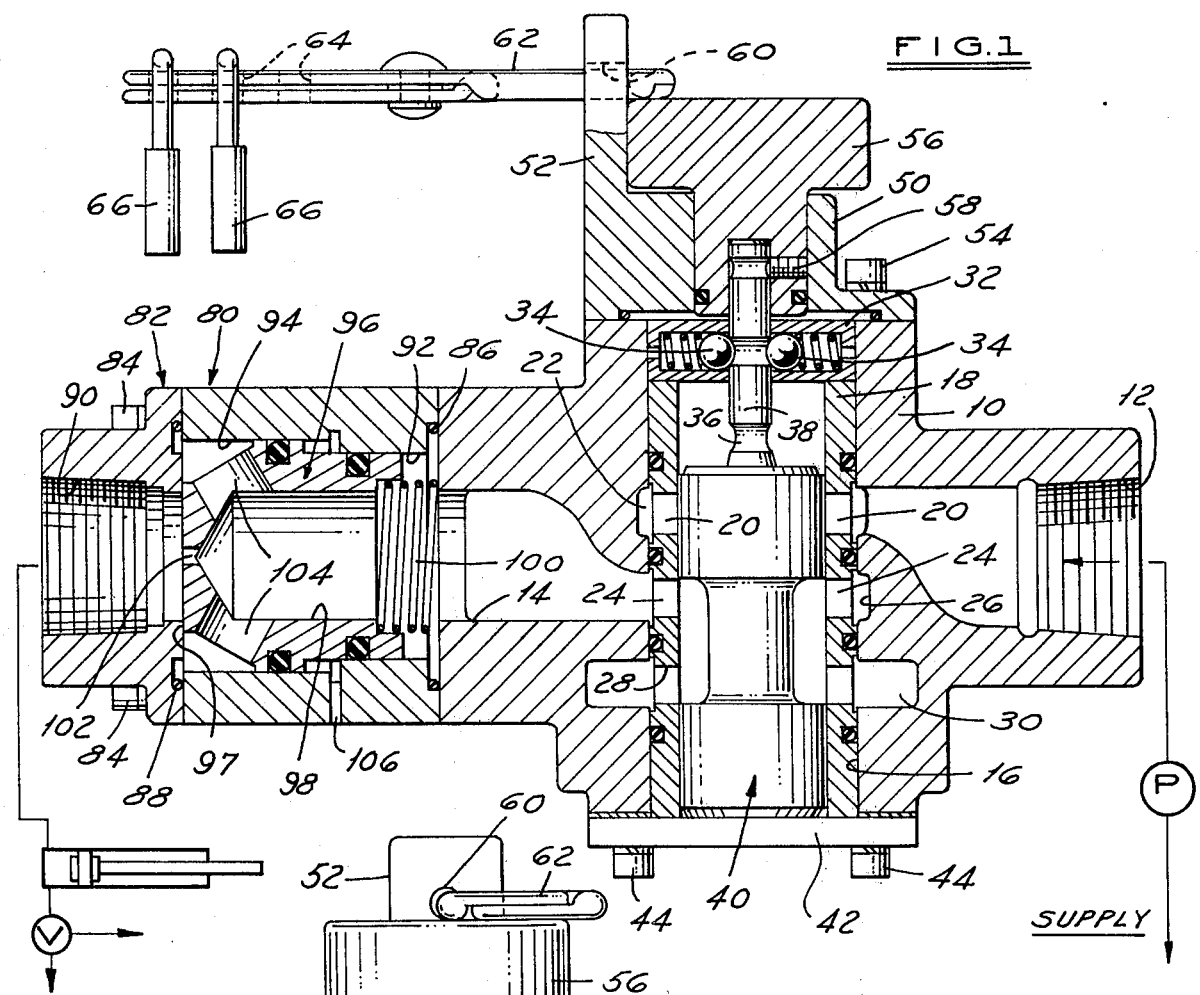

United States Patent [19]
Ruffley

[11] 4,000,684
[45] Jan. 4, 1977

[54] SAFETY LOCK-OUT VALVE

[75] Inventor: Douglas W. Ruffley, Highland, Mich.

[73] Assignee: Numatics, Incorporated, Highland, Mich.

[22] Filed: Mar. 27, 1975

[21] Appl. No.: 562,496

[52] U.S. Cl. .................................. 91/447; 91/443; 137/509; 137/596; 137/613

[51] Int. Cl.² ........................................ F15B 20/00

[58] Field of Search ............ 91/443, 447; 137/383, 137/509, 513.3, 513.5, 513.7, 596, 599, 613

[56] References Cited
UNITED STATES PATENTS

| | | | |
|---|---|---|---|
| 2,318,962 | 5/1943 | Parker | 137/513.3 UX |
| 3,136,226 | 6/1964 | Gratzmuller | 91/447 X |
| 3,149,643 | 9/1964 | Breitsprecher | 137/509 X |

FOREIGN PATENTS OR APPLICATIONS 785,809  5/1935  France ........................ 137/513.3

Primary Examiner—Alan Cohan
Assistant Examiner—Gerald A. Michalsky
Attorney, Agent, or Firm—Barnes, Kisselle, Raisch & Choate

[57] ABSTRACT

A lock-out valve for pneumatic systems which provides the operator with mechanical means to exhaust the system and lock it out with a padlock or similar device and, when unlocked, provides a valve to control automatically the gradual reset of working cylinders and the filling of the system with operating pressure to a safe percentage of line pressure before full line flow is established.

1 Claim, 3 Drawing Figures

SAFETY LOCK-OUT VALVE

This invention relates to a Safety Lock-Out Valve and more particularly to a control valve for a pneumatic system which permits mechanical lock-out of the line pressure and which, when unlocked, provides a gradual filling of the pneumatic system with line pressure before full operation can start. The valve also exhausts line pressure downstream of the valve when a system is shut down.

It is known to provide lock-out valves for fluid pressure systems to prevent unauthorized use of the system or to prevent accidental actuation when repairs or alterations are being made. Problems have occurred, however, when a line pressure is suddenly turned on in a system. The sudden application of pressure is apt to cause violent hammering in the line or rapid reset of the main air cylinders which produce the machine motion. A sudden turn-on may occur when some of the air cylinders, due to the down condition, are out of synchronism with their control valves. A sudden turn-on can cause the air cylinder operated mechanism to catch an operator unaware and cause personal injury or damage to the machine.

It is, therefore, an object of the present invention to provide a slow-start, turn-on valve which effects gradual application of line pressure to a previously disabled system.

It is a further object to provide a turn-on valve which operates automatically and independent of the operator such that no operator judgment is required.

A further object is the provision of a slow-start valve which can be easily incorporated in lock-out valve housings for operation in conjunction therewith.

Other objects and features of the invention relating to details of construction and operation will be apparent in the following description and claims in which the principles of the invention are set forth together with the best mode presently contemplated for the practice of the invention.

DRAWINGS accompany the disclosure and the various views thereof may be briefly described as:

FIG. 1, a sectional view of the lock-out, slow-start valve.

Figure 2:
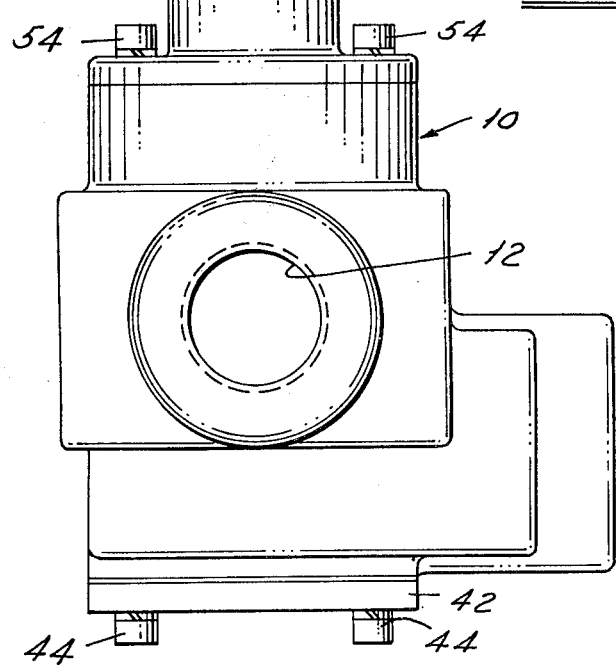

FIG. 2, an end view of the valve housing.

Figure 3:
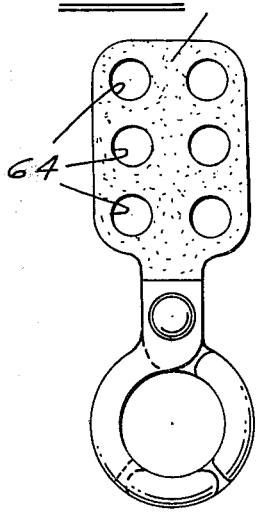

FIG. 3, a view of a multiple aperture locking link for use with the invention.

With reference to the drawings, in FIG. 1, a main valve housing 10 has a main-line inlet port 12, an outlet port 14, and a valve bore 16. In the main bore 16 is a valve sleeve 18 having opposed ports 20 which register with an annular groove 22 in the housing open to the inlet port. Ports 24 in the sleeve register with an annular groove 26 in registry with the outlet port 14. Ports 28 in the sleeve register with an annular groove 30 which connects to an exhaust port (not shown).

Above the valve sleeve 18 is a detent cartridge 32 containing two spring pressed detents 34 to cooperate with detent grooves 36 in a valve stem 38 projecting from a double land spool valve 40. This sleeve, valve, and cartridge assembly is retained by a cover plate 42 held in place by bolts 44.

On the top of the valve housing 10 is a lock-out assembly in the form of a cap housing 50 having a riser 52 on one side and retained and suitably sealed on the housing 10 by bolts 54. A headed actuator knob 56 is secured to the valve stem 38 by a set screw 58. This knob has a sliding sealing fit with the cap 50 and one side of the knob moves along the riser 52 which is apertured at 60 to receive a scissor link lock 62 (FIG. 3). Cross holes 64 in the overlapping flat portions of the link lock provide openings for the curved bar of padlocks 66. These are put in place individually by various workmen such as mechanics, electricians, pneumatics engineers, and the like to prevent the machine being operated until they have finished their installation or repair.

When the link lock 62 is in position, it is impossible to shift the actuator knob upwardly. In the position shown in FIG. 1, the valve 40 is blocking the supply port 12 and the outlet port 14 is connected to exhaust port 30 past the reduced portion (spool reduction) of the valve. When the padlocks are removed, the scissors link 62 can be opened and removed so the knob 56 can be lifted to the second and open position of valve 40 such that supply port 12 is open to the outlet port 14 past the spool reduction and the exhaust port 30 is blocked. In this position, the detents 34 will be engaging lower groove 36 in valve stem 38.

The slow-start portion of the assembly is to be found in the small housing 80 located between the end cap 82 and the main valve housing 10 and fastened by bolts 84. O-rings 86 and 88 seal the joining surfaces. The end cap 82 has an unrestricted outlet port 90 which will be connected to the supply line of a pneumatic system which can consist of a number of control valves, air cylinders, etc.

The housing 80 has a stepped bore 92, 94, the former being smaller than the latter. A differential piston poppet valve 96 within these bores also has stepped diameters, each with sliding seals, to fit and slide in the respective portions of the stepped bore. Valve 96 has a large central bore 98 with an annular groove at one end to serve as a seat for a coil compression spring 100. This central bore terminates in a very small orifice or restricted outlet 102 at the other end opening to outlet port 90. The foreward end of poppet 96 bears against the inside periphery 97 of the unrestricted outlet port 90 in cap 82 in the position shown in FIG. 1. This foreward end of the poppet valve 96 is also ensmalled from the dimension of the bore in which it slides and provided with large cross-ports 104. A small atmospheric relief port 106 relieves pressure between the seals of the poppet valve.

IN THE OPERATION of the device, it will be seen that, as the parts are shown in FIG. 1, the valve 40 is in closed position and the poppet valve 96 is in the left-hand position with only the small port 102 open to outlet 90. When valve 40 is unlocked and moved upwardly, fluid under pressure can flow from inlet 12 past the spool reduction to port 14 and through tiny port or bleed hole orifice 102 to the system outlet 90. Pressure will thus gradually build up in the system, cylinders will move gradually to their proper position and the lines will fill slowly and without shock to a pressure approaching line pressure.

At a certain percentage of line pressure depending on the calibration of spring 100 and the respective diameters of the large and small parts of bore 94, fluid under pressure acting on the larger left-hand end of poppet valve 96 will overcome the pressure on the smaller right-hand end and spring 100, moving the valve 96 to the right, thereby opening the large cross ports 104 to the outlet port 90. This will expose full line pressure to the outlet 90 and place the system in condition for normal operation.

Upon shut down of the system by depression of valve 40, it will be seen that poppet valve 96 will, by action of spring 100, return to the closed position shown in the drawing since port 14 is then connected to exhaust port 30. The small orifice 102 is also connected to the exhaust port and this will allow the protected system to bleed down to atmospheric pressure where it will remain until valve 40 is returned to open position.

It will be seen that the slow-start feature of the assembly is entirely contained within the housing 80 interposed between housing 10 and the cap 82. Thus, removal of housing 80 and placing of the cap 82 on housing 10 provides a standard lock-out valve without the slow-start feature.

I claim:

1. A safety system for fluid operated motors receiving pressure from an upstream fluid pressure source which comprises:

a. a fluid passage leading from an upstream pressure source to a downstream fluid operated motor,
   b. a cut-off valve in said passage movable from a position closing said passage to a position opening said passage,
   c. a safety valve structure in said passage between said cut-off valve and said fluid operated motor comprising:
   d. a housing having a cylindrical recess open at both ends to said passage, said recess having a first bore at the upstream end and a larger concentric bore at the downstream end terminating at an annular wall around an outlet opening,
   e. a valve plug in said recess comprising a cup-shaped element having a restricted opening in the bottom to register with said outlet opening, and a larger, relatively-unrestricted, opening off center from said outlet opening and open to said annular wall, said element having stepped diameters to have a sliding seal fit with the respective bores of said cylindrical recess and to provide differential effective pressure areas at opposite ends of said element within said bores, and
   f. means biasing said valve plug toward said annular wall wherein said valve plug will permit an initial minimal flow of fluid under pressure to said outlet opening through said restricted opening and wherein said valve plug will be shifted by action of differential pressure on the effective end areas of said element to open said larger opening to said outlet opening when pressure is developed downstream of said safety valve sufficient to safely operate said fluid motor.

* * * * *